April 28, 1964   C. H. STEVENS, JR   3,130,478
METHOD OF APPLYING ELECTRIC COUPLER ELEMENTS
AND PROTECTING SLEEVES TO CABLES
Original Filed Oct. 11, 1954                   4 Sheets-Sheet 1
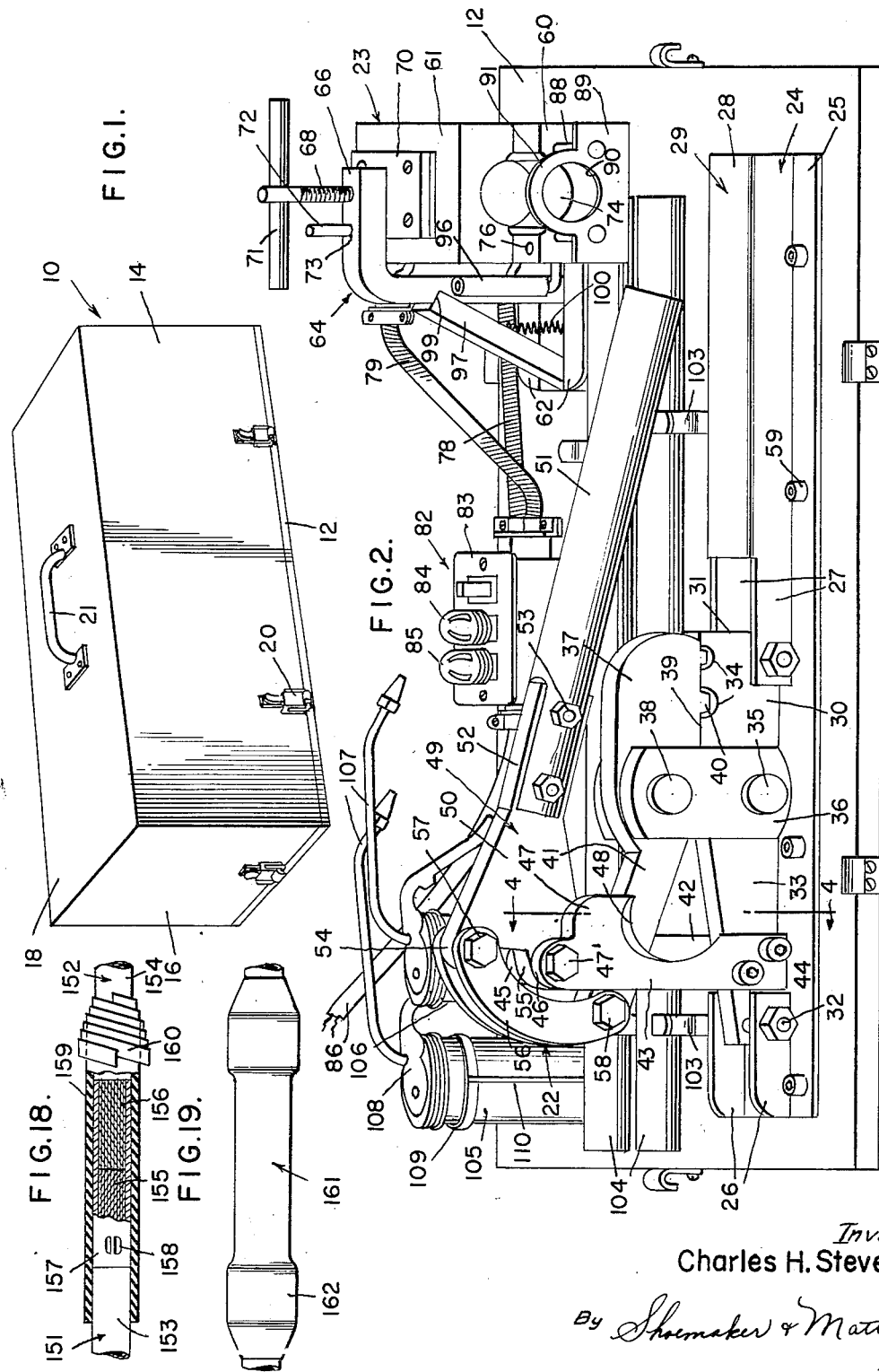
Inventor
Charles H. Stevens, Jr.
By Shoemaker & Mattare
ATTYS.

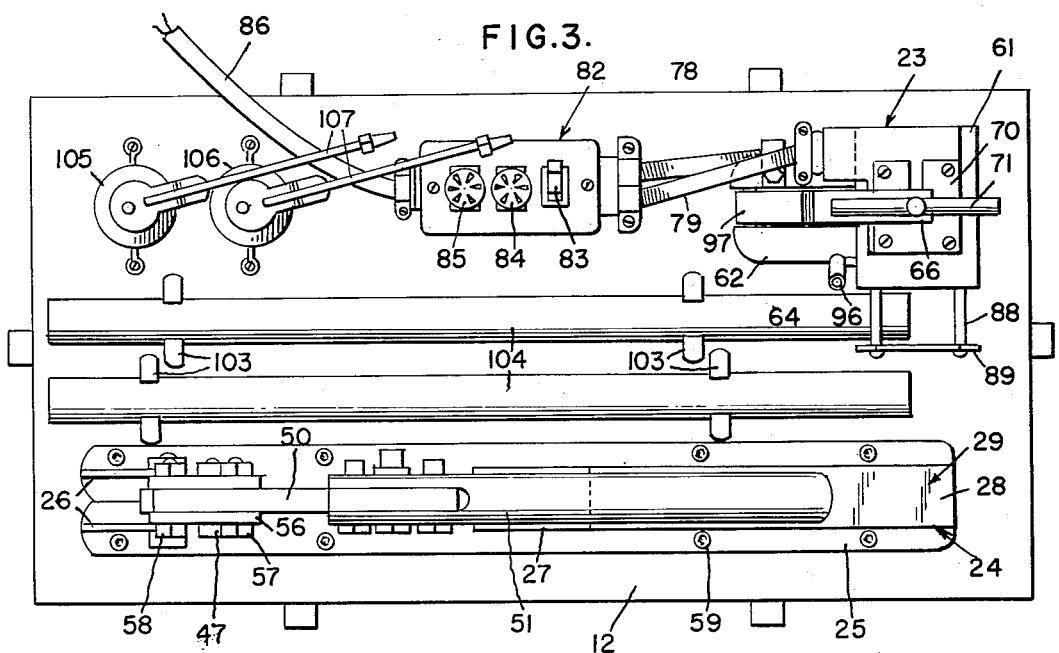
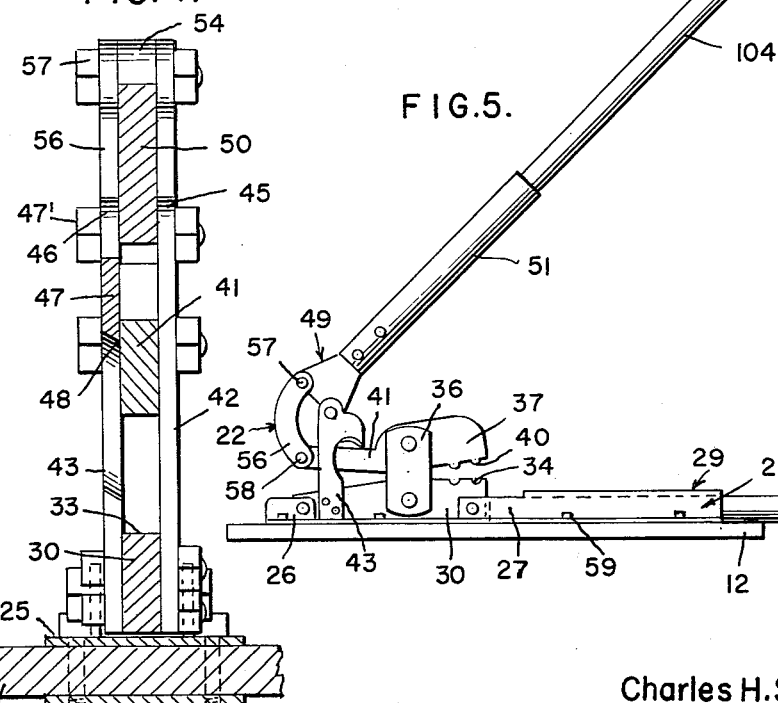

April 28, 1964  C. H. STEVENS, JR  3,130,478
METHOD OF APPLYING ELECTRIC COUPLER ELEMENTS
AND PROTECTING SLEEVES TO CABLES
Original Filed Oct. 11, 1954  4 Sheets-Sheet 3
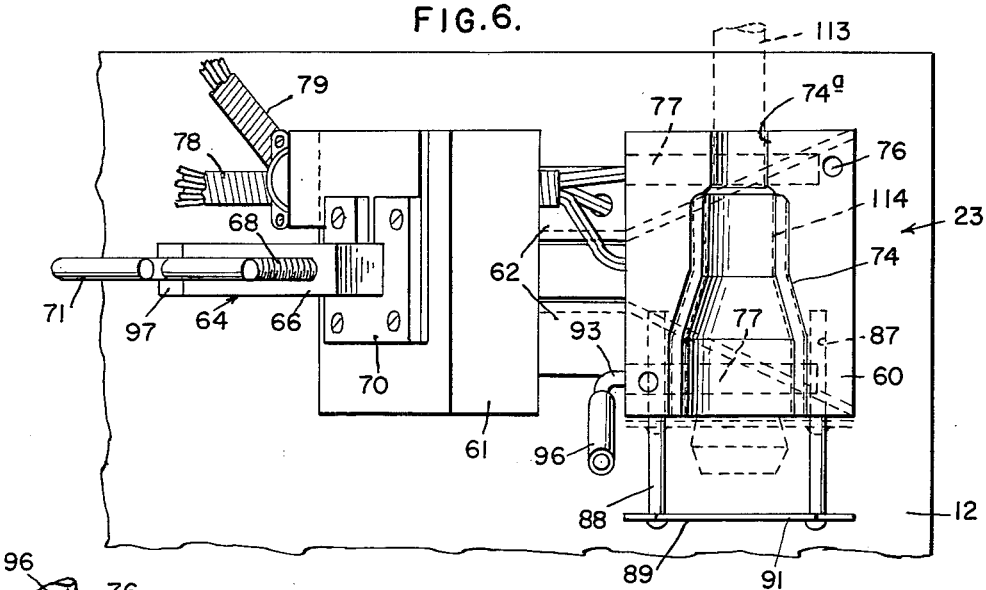
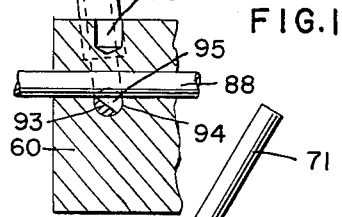
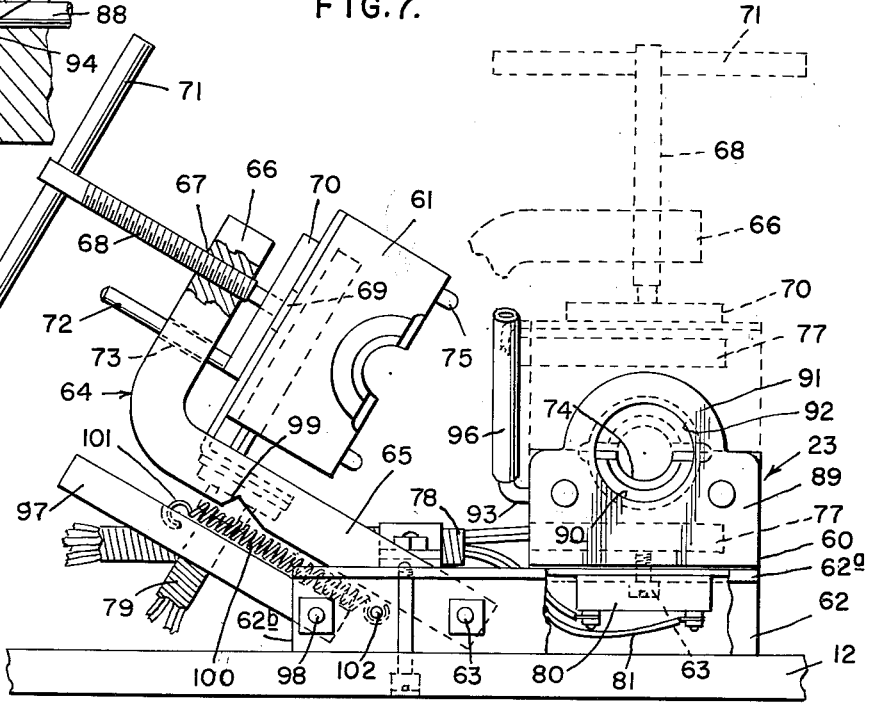
Inventor
Charles H. Stevens, Jr.
By Shoemaker & Mattare
ATTYS.

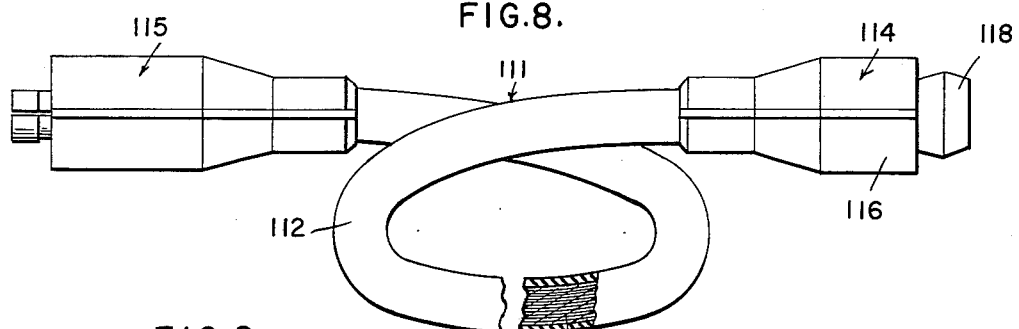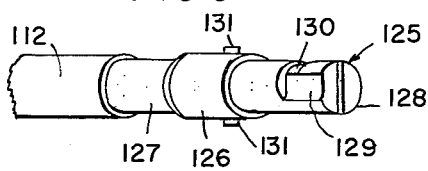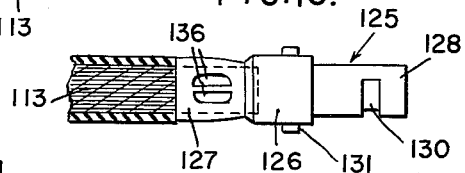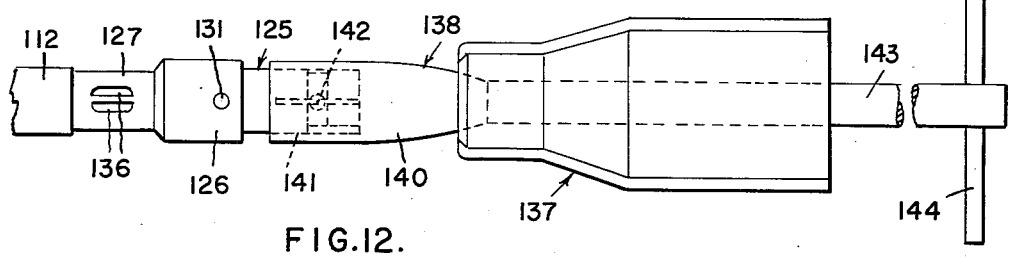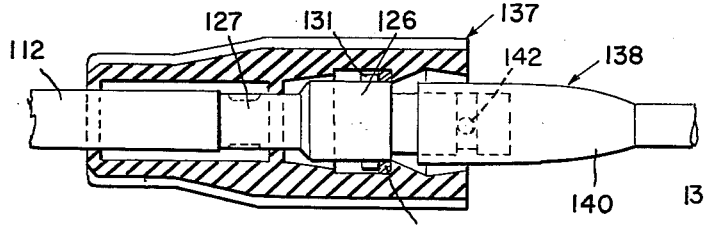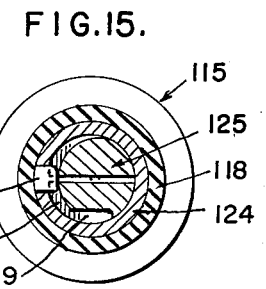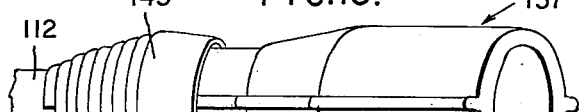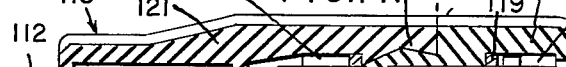

United States Patent Office 3,130,478
Patented Apr. 28, 1964

3,130,478
METHOD OF APPLYING ELECTRIC COUPLER ELEMENTS AND PROTECTING SLEEVES TO CABLES
Charles H. Stevens, Jr., Cornwall Bridge, Conn., assignor to Empire Products Inc., Cincinnati, Ohio, a corporation of Ohio
Continuation of abandoned application Ser. No. 461,505, Oct. 11, 1954. This application Apr. 4, 1958, Ser. No. 726,583
1 Claim. (Cl. 29—155.5)

The present invention relates to repairing of defective electric cables and coupling fittings, and to a method of applying sleeves and electrical connectors to cables.

The present application is a continuation of U.S. Patent application Serial No. 461,505, filed October 11, 1954 and now abandoned.

In many industrial organizations where electrical equipment is used, particularly movable or portable equipment, extensive use is made of lengths of insulated electric cable which have formed integrally with the ends thereof coupling fittings whereby a number of such lengths of cable may be joined together or a connection can be effected between an end of a cable and a piece of equipment or with a source of electric current. These cables are provided by manufacturers complete in various lengths with a male coupling element on one end of the cable and a female element on the other end and with insulation covering extended at the ends of the cable in the form of shielding sleeves over the metal couplings and such couplings and the protecting sleeves thereover are so formed that when a coupling of one cable is connected to or joined to a coupling of another cable a continuous insulation covering or sheath is provided which prevents moisture from reaching the joined or connected parts. The present invention provides a new and novel method for applying the male and female coupling elements and the associated protecting sleeves to the ends of cables when the lengths of cable are initially assembled by the manufacturer.

Much portable electrical equipment is used in factories, on and around docks, on ships and other locations where moisture is commonly present and therefore such cable lengths as above described are also made use of and it is therefore important that the insulation covering of the cables be kept intact particularly for safety reasons because such cables usually carry heavy current loads. Accordingly if and when a break occurs in the insulation covering of such cables it is important that a repair be made or a new cable be put into service and since it is a matter of considerable expense to return such cable lengths to the manufacturer for repair and no equipment has been devised prior to the present invention whereby the user of the cable can make his own repairs, the customary practice is to completely discard the broken length of cable.

In the light of the foregoing it is a particular object of the present invention to provide a method of repairing cables of the character referred to, together with apparatus in the form of a compact complete unit for carrying out such method.

Another object is to provide a method of applying electrical coupling elements and associated protecting sleeves to the ends of cables when lengths of cable are initially assembled by the manufacturer.

In connection with the use of cables of the above described character the most frequent breakage of the insulation occurs at the inner ends of the metal connectors which are attached to the cable and accordingly a further object of the invention is to provide novel method and apparatus for replacing such connectors together with the insulation sleeve encasing the same.

A further object of the invention is to provide apparatus for carrying out the repair method of the present invention, which apparatus is mounted as a compact unit upon a readily transportable body and is complete for facilitating the removal of a damaged connector, the attachment of a new metal connector with the metal cable and placement of the insulation sleeve thereabout and joining the latter to the insulation covering of the cable, so that the desired repair or repairs can be made due to the easy portability of the repair kit wherever the damaged cable may be located when a discovery of the damage is made. More specifically the present invention contemplates the provision of a portable repair kit comprising the assembly upon a suitable carrying structure of a means for severing the damaged cable for the removal of the bad coupling, effecting the metal-to-metal connection of the new connector with the metal cable and the crimping of the connector onto the cable to lock it in place, together with a novel vulcanizing unit whereby the insulation sleeve can be vulcanized to the cut end of the insulation sheath of the cable.

Another object of the invention is to provide a new and novel method of introducing the metal element of a coupling into the tubular encasing, insulating sleeve therefor and a tool for carrying out the operation.

Still another object of the invention is to provide in a compact portable repair kit of the character stated, a novel implement for cutting off the coupler from the cable and for crimp locking the new or substitute metal coupler element onto the bared end of the cable core preliminarily to the application of the insulation sleeve to the metal coupling element and its vulcanization to the insulation sheath of the cable.

A still further object of the invention is to provide a vulcanizing unit for vulcanizing the new insulation sleeve to the insulation covering or sheath of the cable which unit comprises two relatively movable heating molds with novel means for placing the same into operative relation and forcing them together into compressing relation with the inserted connector and effectively maintaining them in such relation during the vulcanizing process.

Cables of the character stated also frequently have the insulation covering for the metal current conductor torn or broken whereby the enclosed conductor may be exposed or moisture may enter the insulation covering or sheath, to create trouble and accordingly another object of the invention is to provide a novel method of making solid splices in such insulated electric cables to restore the same to safe and usable condition or to make such splices between two or more lengths of cable where a solid cable without couplings and of greater length may be desired.

The last stated object is attained by removing a portion of the insulation covering from an end of each of two lengths of cable to expose a length of the metal conductor. These exposed lengths or end portions of the conductor of each of the two cables which are to be joined together, are then inserted into a suitable current conducting sleeve and the sleeve is crimped or otherwise deforced so as to lock it at each end to the inserted metal cable end. An insulation sleeve or sheath, previously placed on one of the cables adjacent to the end thereof is then slipped forwardly toward the joining metal sleeve to cover the latter and also to cover portions of the cable insulation and such insulation sleeve then has its ends joined by fusion in a suitable heater or vulcanizer to the insulation coverings of the cables. Preferably, the joining of the ends of the sleeves to the insulation coverings of the cables is effected by first wrapping a length of a suitable vulcanizable dielectric material such as rubber tape around each end of the insulation sleeve over the end and onto a part of the adjacent insulation covering of the cable. The wrapped ends of the applied insulation sleeve are then placed in a suitable vulcanizer and the necessary amount of heat is applied to soften the wrapping together with the insulation sleeve and adjacent portions of the cable coverings so as to fuse all of the material together to form a tight smooth joint. The vulcanizer is suitably designed to apply pressure to the parts and to mold the material to smooth outlines when it has been sufficiently softened whereby to obtain a joint free of angles or sharp edges.

The manner in which the foregoing and other objects are accomplished will become readily apparent from a consideration of the following detailed description taken in connection with the accompanying drawings with the understanding that the invention is not confined to a strict conformity with the showing of the drawings but may be changed or modified within the scope of the appended claim.

In the drawings:

FIG. 1 illustrates in perspective one form of housing and carrier means which may be provided for the kit to facilitate the transportation of the same from place to place as required.

FIG. 2 is a view in perspective of the several elements making up the kit and mounted upon a suitable supporting or carrying base.

FIG. 3 is a view in top plan of the kit.

FIG. 4 is a sectional view taken in a vertical transverse plane represented by the section line 4—4 of FIG. 2.

FIG. 5 is a view in side elevation of the cutting and crimping tool showing the same in open position together with an extension lever for the handle of the tool and a second extension lever connected with the base supporting the tool to facilitate the closing of the tool jaws.

FIG. 6 is a view in top plan of the vulcanizer unit in open position, the view being taken on an enlarged scale.

FIG. 7 is a view in front elevation of the open vulcanizer unit showing the top mold jaw in closed position in dotted outline.

FIG. 8 illustrates a length of cable of the type with which the present invention is concerned, the central portion of the same being broken away.

FIG. 9 illustrates a first step in connection with the method of renewing a coupler showing, in perspective, a new or replacement metal coupler element applied to a bared end portion of the cable core.

FIG. 10 is a view in side elevation of the elements shown in FIG. 9 and illustrating the crimped condition of the tubular end of the metal connector, by which crimping the connector is firmly coupled with the end of the cable core.

FIG. 11 illustrates the next step of the method after securing the metal connector to the cable core, by which step the metal connector is drawn into one end of the insulation sleeve by means of a puller tool attached to the metal connector, the connector, tool and insulation sleeve all being shown in side elevation.

FIG. 12 is a sectional view taken longitudinally of and through the insulation sleeve showing the next stage in the method where the metal connector is drawn into final position in the sleeve, the metal connector and a portion of the insulated cable and of the puller tool being in elevation.

FIG. 13 is a view illustrating in side elevation the newly applied coupling together with a rubber tape applied thereto in preparation for the vulcanizing step by which the sleeve and insulation covering are joined together.

FIG. 14 is a view illustrating in longitudinal section the insulation sleeves of two connected or joined couplers showing the metal connectors in elevation and electrically coupled together.

FIG. 15 is a sectional view taken substantially on the line 15—15 of FIG. 14.

FIG. 16 is a view in elevation of a female metal connector element showing the puller tool attached thereto.

FIG. 17 is a detail section illustrating a method of locking in set position the adjustable fence forming a part of the vulcanizing mold.

FIG. 18 is a view illustrating a method of forming a solid splice between ends of two lengths of electric current conducting cable, parts being broken away and in section to show the details, the view showing the application of insulation tape to one end only of the applied insulation sleeve.

FIG. 19 is a view in elevation of a completed splice.

Referring now more particularly to the drawings the numeral 10 generally designates a housing in which the present kit invention may be enclosed either for storage or for transportation and which housing comprises a bottom wall, floor or base 12 upon which the units of the kit are mounted and secured as hereinafter described.

The top portion of the housing comprises, as illustrated, the vertical side and end walls 14 and 16 respectively and the top wall 18 and dimensions of the top are such that the lower edges of the vertical walls may rest upon and extend along the side and end edges of the base 12 and suitable means may be provided for locking the top to the base, such as the trunk latches 20 or the like.

The top wall 18 may be provded with the carrying handle 21 as shown and also, while not illustrated, the base 12 may have secured to the underside thereof suitable casters or rollers to facilitate shifting the kit from place to place.

While there is illustrated and described a suitable housing for the kit by which the elements may be protected when not in use, it is to be understood that the invention is not limited to the use of an enclosing structure of this kind but the elements may be mounted upon any other suitable support, the essential thing being that such elements be all grouped together and supported on a unitary structure so that they may be readily moved from place to place for use.

In accordance with the invention there are mounted upon the base 12 two principal units one of which is the cutter and the crimper tool which is generally designated 22 while the other unit is the vulcanizer which is generally designated 23.

Other elements used in association with the two units 22 and 23 will be hereinafter individually described in association with a statement of their uses.

The cutter and crimper unit comprises a fixed horizontal frame which is generally designated 24 and which rests upon and is secured to the top of the base 12 as shown most clearly in FIG. 2. This frame comprises an elongate bottom plate 25 which extends lengthwise of the base 12 and at one end of which, hereinafter referred to as the front or forward end, are fixed two short upstanding flanges 26 which are in spaced parallel relation and disposed longitudinally of the frame plate 25 as shown.

Extending in spaced parallel relation longitudinally of the plate 25 from the other or rear end are the elongate upstanding flanges 27 which are connected throughout the major extent of their length from the rear ends thereof by the web plate 28 thereby forming with the frame plate 25, an elongate socket which is generally designated 29 and the purpose of which is hereinafter set forth.

As illustrated the inner ends of the flanges 27 are in spaced relation with the inner ends of the short flanges 26 and mounted upon the plate 25 to extend longitudinally thereof in a plane passing between the pairs of flanges is an elongate flat bar 30 disposed with one longitudinal edge directed upwardly and a portion of which longitudinal edge is substantially horizontal forming an anvil 31.

The forward and rear ends of this bar 30 are firmly secured to the plate 25 in a suitable manner as, for example, by means of transverse bolts 32 passing through the adjacent flanges 26 and 27 between which the ends of the bar are located. However, other means may be employed for securing the bar in position as, for example, by welding the bar to the base and flanges if desired.

The top edge of the forward portion of the bar 30 slopes downwardly slightly as shown through approximately half of the length of the bar to allow for necessary up and down movement of a third jaw hereinafter described.

The anvil 31 has formed transversely of the top thereof the upwardly opening substantially semi-circular grooves 34, each of which provides a seat for a metal connector while the same is being crimped or deformed to secure it to the end of the cable core in the manner hereinafter described.

Extending transversely through the bar 30 approximately midway between its ends, is a pivot bolt 35 and upon opposite sides of the bar are short upstanding coupling links 36, through the lower ends of which the pivot bolt 35 passes whereby the links are supported for a slight rocking movement, the lower ends of the links being slightly rounded as shown to allow for such rocking movement in an obvious manner.

Between the upper ends of the links 36 is located a relatively heavy flat jaw 37 which is pivotally retained in position between the links by the upper pivot bolt 38 which passes through the upper ends of the links and through the jaw as shown.

One end of the jaw extends rearwardly and has a straight bottom face 39 which is adapted to be brought into position against the top of the anvil 31 and extending across this face 39 are crimping teeth 40 which are positioned to enter the grooves 34 as illustrated when the jaw 37 is in closed relation with the anvil 31.

The teeth 40 may be single or in pairs as desired, two teeth being preferred for each of the grooves 34 as providing a better crimping action upon the work.

Formed integral with the jaw 37 and extending forwardly therefrom at an upward inclination with respect to the jaw face 39 is a cutter arm 41. The forward end of this arm 41 passes between and extends slightly beyond two spaced parallel and upright members 42 and 43, the member 42 constituting merely a guide and the member 43 constituting a cutter.

As shown the guide and cutter members 42 and 43 are of substantial length and have the forward end of the bar 30 disposed between their lower ends and are secured thereto by the transverse bolts 44. The upper ends of the members 42 and 43 are formed to provide upstanding ears 45 and 46 respectively which are connected by a transverse pivot bolt 47' for supporting the hereinafter described cutter arm actuating lever.

The cutter member 43 has its upper portion extended rearwardly to form a cutting blade 47 which is provided with the curved downwardly facing or downwardly directed cutting edge 48.

As shown in FIGS. 2 and 5 the cutter arm is positioned for cooperative action with the cutting edge of the blade in the up and down swinging movement of the cutter arm, the arm being positioned against the inner side of the cutter member 43 so that one side face will wipe across the flat side of the beveled blade edge 48 to effect the cutting of a cable lying across the top of the cutter arm during the upward swinging movement of the arm.

The cutter operating lever which is generally designated 49 comprises a head 50 and a tubular handle 51. As illustrated the head 50 is of substantial width at one end and tapers to an elongate shank 52 at the other end which shank is extended into an end of the tubular handle 51 and secured thereto by transverse bolts 53 or in any other suitable manner.

The head 50 at the forward end has two forwardly extending pivot ears 54 and 55. The pivot ear 55 is disposed between the ears 45 and 46 of the guide and cutter members 42 and 43 respectively and has the pivot bolt 47' passing therethrough.

The ear 54 is disposed between the spaced ends of two elongate longitudinally curved links 56 and a pivot bolt 57 extends through the ear 54 and the ends of the links 56 on opposite sides thereof as shown while the opposite ends of the links 56 have disposed between them the end portion of the cutter arm 41 to which they are pivotally secured by the transversely extending pivot bolt 58.

While the frame structure 24 for the cutter and crimper unit may be constructed in any suitable manner it may be conveniently produced by the employment of two T bars laid upon the base 12 with the heads down and in edge-to-edge contacting relation as shown in FIG. 3 and with the web portions projecting upwardly and such web portions may be cut away intermediate their ends to provide the forward short flanges 26 and the long rear flanges 27.

Outwardly from the flanges 26 and 27 the plate 25 or the heads of the T bars, if such are employed, may have extended through them and into the base 12 suitable securing elements 59 which may be in the form of screws, bolts, rivets or the like.

The vulcanizer unit 23 comprises a lower stationary mold block 60 and an upper shiftable mold block 61. These mold blocks are of generally rectangular form and the lower block 60 is mounted across the ends of a pair of spaced parallel angle bars 62 which are arranged with two flanges in vertical spaced relation and the other two flanges in oppositely directed horizontal relation as is clearly shown in FIGS. 6 and 7, the horizontal flanges, designated 62a, having securing screws 63 passed upwardly therethrough into the bottom of the mold block 60 to maintain the latter securely in position thereon.

At one side of the block 60 the spaced vertical flanges of the angle bars designated 62b, have extending therebetween a pivot pin or bolt 63 which passes through and pivotally or rockably supports an upper mold block supporting unit which is generally designated 64 and which comprises an elongate post portion 65, through the lower end of which the pivot pin 63 passes and an angularly extending upper end arm 66.

The arm 66 has formed vertically therethrough the threaded passage 67 through which passage is threaded the elongate screw 68, the lower end of which carries a head 69 which is swivelly attached to the top of the upper mold block by means of the slotted plate 70, shown most clearly in FIG. 3.

The outer end of the screw 68 carries a cross arm 71 by which rotation of the screw is facilitated for the purpose of moving the upper mold block into and out of cooperative relation with the fixed lower block 60.

Also attached to the slotted plate 70 is a guide pin 72 which passes through an opening 73 in the arm 66 and functions to maintain the mold block 60 against turning movement when the mold block is shifted inwardly or outwardly by rotating the screw 68.

The mold blocks 60 and 61 are of approximately the same dimensions and when the carrying means 64 for the upper block is swung to a substantially vertical position, the upper mold block 61 will be disposed directly over the lower block and can be moved down or lowered onto the top of the lower block as will be readily apparent and in order to effect the desired centering of the blocks and of the complementary semi-circular molding recesses 74 therein, one of the blocks, here shown as the upper block 61, is provided with a pair or more of short positioning pins 75 which enter sockets 76 when the blocks are placed together.

The molding recesses 74 of the two blocks when brought into coinciding relation provide a circular elongate molding chamber dimensioned to receive the insulation sleeve forming a part of a terminal for the electric cable and as shown in FIG. 6 the recess at the forward end is of substantial width and gradually decreases toward the opposite end where it is of a minimum diameter in the neck portion 74a which is adapted to receive a portion of the insulated cable.

Each of the mold blocks 60 and 61 has embedded therein a suitable electrical resistance unit 77 to which units electric current is carried through suitable conductors carried in the cables 78 and 79, the cable 78 carrying current conductors going to the lower heating unit and the cable 79 carrying conductors going to the upper heating unit.

The numeral 80 generally designates a conventional type of rheostat through which electric current passes by means of conductors 81 to the heating units 77. This thermostat functions to cut off the current supply to the heating units when the mold blocks reach a predetermined temperature.

The numeral 82 generally designates a junction box which houses a suitable switch, not shown, for shutting off the flow of current to the heating units. The button for actuating the switch is indicated at 83 and extends through the top of the box.

Also mounted upon the junction box are two electric signal light units 84 and 85, one of which when energized shows red and the other, when energized, shows white.

The numeral 86 designates the cable through which electric current is carried from a suitable source of supply through the junction box to the thermostat and heating units.

The switch and signal lamps 84 and 85 together with the thermostat and heating units are all wired in a conventional manner whereby when the switch button 83 is moved to on position both the red and white signal lights will be energized and the current will flow through the thermostat to the heating units. While the red signal lamp is on this will indicate that the heating units have not attained the desired maximum temperature but when such temperature is reached the red signal lamp will go off and only the white signal lamp will remain lighted to indicate that the line is closed up to the thermostat.

Since the wiring arrangement for the switch, signal lamps, thermostat and heating units is conventional, as stated, no wiring diagram is believed to be necessary.

The forward or front end of the lower mold block 60, which is the end through which the wider end of the molding recess 74 opens, has formed therein the two parallel sockets 87 which are at opposite sides of the recess 74 and slidably extended into these sockets 87 are pins 88 which support between their forward ends a fence plate 89. By sliding the pins 88 inwardly this fence plate 89 may be brought into close proximity to or against the front end of the lower mold block and the top edge of the fence has a substantially semi-circular recess 90 which aligns with the semi-circular edge of the forward end portion of the mold recess 74 and extending upwardly and arching over the recess 90 is a semi-circular member 91 which has in its under edge the semi-circular recess 92 which matches the recess 90 in the fence plate to form the complete circular opening for the purpose hereinafter set forth.

Suitable means is provided for securing the fence plate in adjusted position, such means here being shown as a short shaft 93 which is rotatably supported in a circular passage 94 formed in the mold block 60 to extend across and intersect a socket 87 in which one of the pins 88 is slidably engaged. The shaft 93 is provided with a transverse notch 95 through which the adjustment pin 88 passes and when the shaft is partially rotated the edge of the notch engages the adjacent pin 88 as shown in FIG. 17 to secure the pin against movement.

The outer end of the shaft 93 carries the angularly extending crank arm 96 by means of which the shaft 93 is turned.

When the upper mold block 61 is disposed over the lower block the post 65 will assume a substantially vertical position as shown in FIG. 2 and when this position is assumed means is provided for locking the post against reverse swinging movement. Such locking means comprises a latch bar 97 pivotally supported at one end on a pin 98 which extends across between and is supported by the vertical webs 62b of the angle bars 62, such pin 98 being located outwardly from the pivot pin 63 on the side of the latter remote from the mold blocks.

The outer side of the post 65, that is, the side of the post remote from the mold blocks, is provided with a keeper notch 99 in which the upper end of the latch bar 97 engages when the post 65 is vertical, as shown in FIG. 2 and to effect automatic engagement of the latch bar with the post when the latter is swung to vertical position, there is provided the coil spring 100, one end of which is secured as indicated at 101 to the bar 97 upon the side nearest to the post 65, while the other end of the spring is connected to a suitable pin 102 located between the post and bar and attached to one of the angle bars 62 as illustrated in FIG. 7. As is also shown in this figure when the latch bar 97 is swung back together with the post 65, the spring 100 will be under tension or stretched and will therefore function to swing the bar 97 over into latching position when the post 65 is positioned uprightly.

The base 12 is provided with longitudinally spaced pairs of spring clips 103 and removably mounted or secured between the clips of each pair is an auxiliary handle bar or lever 104, one of which is adapted to be inserted into the end of the tubular handle 51 of the cutter and crimper unit while the other auxiliary handle bar 104 is adapted to be inserted into the socket 29 as illustrated in FIG. 5 for facilitating the operation of the cutter and crimper unit.

The kit is also provided with two liquid dispensers 105 and 106. These dispensers may be of any suitable type such, for example, as a conventional oil can and each is provided with a discharge nozzle 107 and a pivoted lever 108, the operation of which works a conventional piston for ejecting the liquid from the dispenser through the nozzle.

One of the dispensers 105 or 106 is designed to contain a rubber solvent such as toluene while the other dispenser or receptacle is designed to contain a suitable soap solution for application to the surface of each of the molding recesses.

Any suitable means may be provided for maintaining the dispensers in position upon the base such as a ring 109 supported by suitable posts 110 as shown in FIG. 2, the dispensing receptacle being inserted through the ring and thereby maintained in upright position and against accidental displacement when the kit of the base is moved about.

In FIG. 8 there is illustrated a broken length of insulated cable together with male and female connectors upon the ends thereof, which cable is of the type in connection with which the present method of repair is employed by the use of the equipment hereinbefore described. This insulated cable is generally designated 111 and it comprises the rubber sheath 112 through which extends the current conducting wire core 113.

The numerals 114 and 115 designate respectively the connectors at the ends of the cable, which are conventionally identified respectively as male and female connectors.

The male connector comprises a preformed elongate rubber sleeve 116 having the passage 117 longitudinally therethrough and the rear end of this sleeve is of reduced external diameter as indicated at 116a while the forward end is of larger diameter as indicated at 116b and carries the axially extending head at 118. This head 118, as shown, is of maximum diameter or circumference centrally of its ends and tapers slightly outwardly toward the free end and inwardly toward the adjacent end of the sleeve body whereby the head will function to effect a secure and tight connection with a connector, corresponding to the female connector 115 and carried upon the end of the second or another length of cable.

Within the passage 117 there is fitted a metal collar 119 having notches or slots 120 therein which open toward the narrow end of the sleeve and the function of which is hereinafter set forth.

The connector 115 is of somewhat similar construction to the connector 114 and comprises the preformed long sleeve body 121 through which extends a passage 122. The inner end of this sleeve is of reduced diameter as indicated at 121a and the outer or forward end is of maximum diameter as indicated at 121b and the forward end of the passage 122 is enlarged as indicated at 123 forming a socket adapted to snugly receive the head 118 of a connector 114 carried upon the end of another length of cable.

The ends of the metal core 113 of the cable carry metal terminals which are designated 124 and 125 and which are housed within the connector sleeves.

The metal terminal housed within the female connector 115 is here designated by the reference character 125 and as shown comprises a body portion 126 having upon one end a thimble 127 in which the end of the metal cable core 113 is secured while from the opposite end of the body 126 extends the reduced pin 128 which is flattened as indicated at 129 along a portion of one side, from the free end and has a short circumferentially directed slot 130 which opens at one end onto the flattened portion at the inner end of the latter.

The body portion 126 of the metal terminal 125 carries the two short radially directed lugs 131 which, when the terminal is housed in its insulation sleeve, function to secure the terminal in its insulation sleeve in the manner hereinafter described.

The connector sleeve 115 has secured in the wall of the passage 122 at the inner end of the socket 123, a metal collar 132 corresponding to the collar 119 and having slots or notches 132a therein. When the metal terminal 125 is fixed within the sleeve of the connector 115 the pins 131 are tightly frictionally engaged in the notches 132a and a portion of the insulation sheath 112 extends into the passage 122 as shown in FIG. 14 and is firmly bonded thereto to prevent the entrance of moisture into the sleeve.

The metal terminal 124 is designed to be housed within the male connector sleeve 114 and this terminal comprises the cylindrical body portion 133 from one end of which extends the thimble 134 in which is fixed an end of the cable core 113.

The body 133 has a socket formed therein from the end remote from the thimble, as indicated at 135, which is dapted to snugly or tightly receive the pin 128 of a joining connector and within the socket 135 a short lug 136 is fixed to the socket wall which is adapted to slide along the flattened surface 129 of a terminal 125 when the latter is inserted into the socket and to then enter the circumferential slot 130 when the terminals are relatively rotated so as to lock the terminals together, it being understood, of course, that the terminal 125 would be in a sleeve in an end of one length of cable and the terminal 124 would be in the sleeve of the terminal of another length of cable thereby electrically connecting the cable lengths together.

The insulation sheath 112, of course, covers the core right up to the thimble 134 and a portion of this sheath extends into the inner end of the passage 117 of the male connector and is bonded to the connector to make a watertight joint.

As hereinbefore stated in the use of these cables the insulation covering of the metal core becomes frayed or is damaged so that there is danger of the current being carried by the core escaping to cause damage and when this occurs it is important that a new cable be provided or that the damaged cable be repaired.

In carrying out the method of the present invention by the use of the equipment hereinbefore described the necessary repair is effected as follows.

When the break in the insulation sheath occurs adjacent to one of the terminals, which is the most common point of breakage in the sheath, the cable is cut by placing the cable across the top of the cutter arm 41 under the edge 48 of the cutting blade 47 after elevating the handle 51 of the cutter to the proper elevation to allow for the insertion of the cable in this manner.

Since the cables are of relatively thick and heavy construction a considerable force is required to effect the cutting operation and for this reason the auxiliary levers or handles 104 are provided, one of these being inserted in the outer end of the tubular handle 51 as shown in FIG. 5 and the other being inserted in the socket 29. The operator can then grasp the handle in the socket 29 and grasp the outer end of the other handle which is connected to the handle 51 and by the additional leverage afforded by the auxiliary or extension handles connected respectively in the handle 51 and the socket 29 effect the cutting of the cable with a minimum of effort.

The following description is directed to the method of securing a metal terminal such as indicated by reference numeral 125 and an associated protecting sleeve to the end of a cable, it being understood that exactly the same procedure is followed in securing a connector such as shown at 124 and an associated protecting sleeve to the end of a cable. It is apparent that the following procedure may be employed either when repairing a damaged length of cable, or when initially applying the connectors and sleeves to the ends of cables at the factory.

After removing the damaged connector, the operator then removes a portion of the insulation sheath 112 from the core 113 and the bared section of the end of the core is then inserted into the thimble 127.

The thimble of the metal terminal is then tightly locked and electrically connected with the inserted end of the cable core by raising the handle 51 of the cutter and crimper and placing the thimble in a groove or seat 34 in the top of the anvil 30 and then closing the jaw 37 against the anvil to thereby press the crimping teeth 40 into the thimble. This operation mashes the thimble slightly and forms the indentations 136 therein which cause portions of the wall of the thimble on the inside to be pressed into the cable core as will be readily apparent. Although it is considered preferable to connect the end of the cable to the metal terminal by crimping as described above, the cable end may also be secured to the terminal by other suitable means such as by soldering the cable end to the terminal, or the like.

The next step in the method is to introduce the metal terminal into a new insulation sleeve such, for example, as that illustrated in FIGS. 11, 12 and 13 where such a new sleeve is generally designated by the reference character 137. For this purpose there is provided the special tool 138. This tool is designed particularly for use in connection with the metal terminal 125, a slightly different type of tool being provided as indicated at 139 and hereinafter described, for inserting the socketed metal terminal 124 in its protective sleeve.

The tool 138 comprises a relatively long cylindrical head 140 having a socket 141 formed axially therein from the free end thereof, which socket substantially conforms with the socket 135 formed in the end of the metal terminal 124 and has fixed in the wall thereof the short lug 142. From the opposite end of the head 140 extends the long handle shank 143 which is preferably provided at its free end with the cross arm 144 to facilitate grasping and pulling the tool in the manner about to be described.

As a preliminary step to drawing the terminal 125 into its sleeve 137, this sleeve corresponding, as will be readily apparent, with the female connector sleeve 115, the head or body portion 140 of the tool is first covered with the toluene as sprayed from one of the dispensing receptacles 105 or 106 to facilitate the sliding of the tool head through the rubber sleeve. This chemical has a softening action upon the sleeve so that the tool head readily slips therethrough, otherwise due to the close fit of the parts considerable difficulty would be encountered in getting the tool through the sleeve. The tool head is then inserted into the sleeve from the larger end and forced entirely through the smaller end of the sleeve and is then coupled with the pin 128 of the terminal as illustrated in FIG. 11 by inserting the pin into the socket 141 and effecting the connection of the lug 142 in the circumferential groove 130 of the terminal pin. Additional toluene may then be sprayed over the tool head and over the parts of the terminal and the tool is then drawn back through the sleeve to draw the terminal into the sleeve to the position illustrated in FIG. 12 where the body 126 is located within the metal collar 132 and the pins 131 secured in the collar slot, as illustrated.

The tool is then disconnected from the metal terminal and the next step in carrying out the method of the invention is to wrap a rubber insulation tape 145 around the small end of the sleeve, carrying the wrapping over onto the insulation sheath 112 of the cable, it being understood that in drawing the terminal 125 into the sleeve a portion of the insulation sheath 112 will enter the sleeve as illustrated in FIG. 12 so that the insulation sheath will be in close contact with the small end of the sleeve as is shown in this figure.

After the rubber insulation tape 145 has been wrapped around the end of the sleeve and the adjacent insulation sheath of the cable as shown in FIG. 13 the vulcanizer is opened and the sleeve is laid in the molding recess 74 of the lower mold block. In this position the rubber insulation tape 145 will be located partly in the narrow portion 74a of the recess and partly in the adjacent larger part of the recess. The upper mold block 61 is then closed down over the sleeve and the fence plate 89 is then shifted inwardly until it bears against the large end of the sleeve as illustrated in dotted outline in FIG. 6. In this particular figure it will be seen that there is shown in dotted outline in the mold recess 74, a male connector sleeve such as that designated 114 in FIG. 8. When a new sleeve of this type is to be vulcanized it will be seen that the head portion will project beyond the front of the mold block and it is for this reason that the opening is provided in the fence plate 89 so that the plate can be brought into position against the end of the sleeve around this head.

After the plate has been placed into position against the end of the sleeve it is locked and the upper mold block is then forced down tightly by means of the screw 68 to tightly bind the new sleeve in the vulcanizer.

By the provision of the fence plate against the large end of the sleeve in the vulcanizer the tendency of the sleeve to slip forwardly out of the mold recesses of the vulcanizer is prevented.

The heating elements are now energized in the vulcanizer mold blocks and the proper temperature is developed to soften the insulation tape 145 and mold it integrally with the end of the sleeve and the sheath 112 to thereby form a water and gas-tight insulation connection between these parts.

Due to the extreme pressure which is applied to the rubber installation tape 145 enclosing the vulcanizer, after the molding operation is completed some of the melted or softened tape will have formed thin fins at opposite sides of the sleeve and cable and these are then trimmed off to provide a neat connection between the sleeve and the cable sheath such as is shown in FIG. 8.

As hereinbefore stated the same procedure is followed in inerting a new terminal 124 in a new sleeve 114 as has been described in connection with the placement of the new terminal 125 in a new sleeve 115 except that a slightly different type of tool is employed for pulling the terminal into the sleeve. This tool, generally designated 139, has a solid cylindrical head 146 with a diameter to fit into the socket 135 and this head is formed in the same manner as the pin 128 in that it is provided with a longitudinally extending flat face and a short circumferential channel corresponding to the face 129 and the channel 130 so that when the head is inserted into the socket 135 the lug 136 will first slide along the flat side of the head and then by turning the head the lug will be made to enter the circumferential channel thereby locking the head and the terminal together. The terminal may then be pulled through and into the new sleeve in the same manner as described in connection with the insertion of the terminal 125.

As hereinbefore stated the present invention is directed to the making of solid splices in cable whereby ends of two lengths of insulated cable may be joined together to obtain a greater cable length and FIGS. 18 and 19 illustrate such a solid splice.

In FIGS. 18 and 19 the reference numerals 151 and 152 designate end portions of two insulated electric cables. Numerals 153 and 154 respectively designate the insulation covering for the cables while the numerals 155 and 156 designate respectively the ends of the metal conductors enclosed in the insulation covering.

In accordance with the present invention when a solid splice is to be made between the ends of two lengths of cable a portion of the insulation covering is cut away for a short extent of the cable length at each end to bare a terminal portion of the metal conductor. These terminal portions are shown in FIG. 18 and the reference numeral 155 also designates the same as well as identifying the metal conductors.

The terminal portions of the cable conductors are electrically connected by a metal sleeve 157, each end of which sleeve has a conductor terminal portion inserted thereinto as illustrated. Following the insertion of the ends of the metal conductors into the sleeve, the sleeve is crimped or deformed at each end as indicated at 158 by means of the crimper unit 22 by placing the end of the sleeve in one of the seats 34 and forcing the crimping teeth down thereon in the manner previously described in connection with the securing of a thimble on an end of a cable.

Prior to the securing of the two cable ends in the conducting sleeve 157, an insulation sleeve 159 is slipped onto one of the cables adjacent to the end to be joined to the other cable and after the conductors of the two cables have been inserted and secured in the metal sleeve 157 in the manner described, the insulation sleeve is shifted to cover the metal connector sleeve 157 as illustrated in FIG. 18 and the insulation sleeve is also of sufficient length to extend beyond the ends of the sleeve 157 for engagement with the cable insulation as shown.

Each end of the insulation sleeve 157 is then wrapped with rubber tape 160 as illustrated, the wrapping covering a portion of each end of the sleeve and a portion of the adjacent cable insulation covering. In FIG. 18 only the wrapping at one end of the insulation sleeve has been illustrated but it will be understood that the opposite end of the insulation sleeve 159 will be wrapped in a like manner.

Following the application of the wrapping over each end of the insulation sleeve the entire connection is then placed in a vulcanizer of the character shown and designated 23 for vulcanizing the connection between the sleeve and the insulation covering of the two cables.

It will be understood, of course, that the interior of the vulcanizer will be modified to provide cooperating or coacting molding recesses of the proper form and size to receive the splice joint. Otherwise the vulcanizer will be of the same form and construction as illustrated in FIGS. 6 and 7.

After placing the joint in the vulcanizer and clamping the upper mold block in position so as to firmly compress the parts of the joint, the vulcanizer is heated in the manner previously described for the necessary period of time to soften and mold the wrapping 160 around the ends of the insulation sleeve so that all of the parts of the insulation including the insulation wrappings 153 and 154, the ends of the insulation sleeve 159 and the insulation tape 160 will be smoothly molded together to produce the completed joint shown in FIG. 19 and generally designated 161. As shown in this figure each end of the insulation sleeve becomes integral with molded and tapered sleeves 162 which are formed from the insulation tape and these are firmly bonded in fluid-tight connection with the insulation coverings of the joined lengths of cable.

In carrying out the methods hereinbefore outlined, before vulcanizing the joined parts, the insulation covering of the cable, or cables, is roughened to remove all wax from the surfaces and a suitable tool (not shown) will be furnished as a part of the kit, for this operation. As this invention may be embodied in several forms without departing from the spirit or essential characteristics thereof, the present embodiment is therefore illustrative and not restrictive, and since the scope of the invention is defined by the appended claim, all changes that fall within the metes and bounds of the claims or that form their functional as well as conjointly cooperative equivalents are therefore intended to be embraced by the claim.

I claim:

The method of interconnecting a pair of cable ends comprising connecting a coupler element with the electrical conductor means of each of said cables, then introducing each of said coupler elements with the attached cable through one end portion of a preformed hollow insulating sleeve such that the coupler elements are surrounded by and housed within the associated insulating sleeves with substantial portions of the coupler elements and associated cable ends spaced from the associated sleeves, effecting a fluid-tight joint between the insulation covering of each of the cable ends and only one end portion of the associated insulating sleeves, moving said coupler elements into contacting relationship and rotating them into locked position and substantially simultaneously automatically moving interengaging complementary faces on the insulating sleeves into cooperating relationship to provide a fluid-tight seal therebetween.

References Cited in the file of this patent

UNITED STATES PATENTS

| | | |
|---|---|---|
| 963,800 | McIntosh et al. | July 12, 1910 |
| 1,871,397 | Watts | Aug. 9, 1932 |
| 2,226,449 | Stephens | Dec. 24, 1940 |
| 2,279,794 | Olson | Apr. 14, 1942 |
| 2,288,918 | Parker | July 7, 1942 |
| 2,338,524 | McCabe | Jan. 4, 1944 |
| 2,357,719 | Hoban | Sept. 5, 1944 |
| 2,359,532 | Searle | Oct. 3, 1944 |
| 2,396,702 | Johnson et al. | Mar. 19, 1946 |
| 2,407,683 | Prentice | Sept. 17, 1946 |
| 2,480,280 | Bergan | Aug. 30, 1949 |
| 2,563,829 | Fitzgerald et al. | Aug. 14, 1951 |
| 2,677,115 | Stevens | Apr. 27, 1954 |
| 2,742,622 | Stevens | Apr. 17, 1956 |
| 2,812,506 | Merrill | Nov. 5, 1957 |
| 2,818,363 | Woolley | Dec. 31, 1957 |
| 2,842,750 | Randal let al. | July 8, 1958 |
| 2,842,750 | Randall et al. | July 8, 1958 |
| 2,877,544 | Gammel | Mar. 17, 1959 |

FOREIGN PATENTS

| | | |
|---|---|---|
| 22,404 | Great Britain | of 1891 |
| 603,975 | Great Britain | June 25, 1948 |